US012805483B2

(12) United States Patent
Wang

(10) Patent No.: US 12,805,483 B2
(45) Date of Patent: Nov. 24, 2026

(54) CHILD STROLLER AND PET BASKET THEREOF

(71) Applicant: Goodbaby Child Products Co., Ltd., Kunshan City (CN)

(72) Inventor: Qing Wang, Kunshan City (CN)

(73) Assignee: Goodbaby Child Products Co., Ltd., Kunshan City (CN)

(*) Notice: Subject to any disclaimer, the term of this patent is extended or adjusted under 35 U.S.C. 154(b) by 274 days.

(21) Appl. No.: 18/647,564

(22) Filed: Apr. 26, 2024

(65) Prior Publication Data

US 2024/0268335 A1 Aug. 15, 2024

(30) Foreign Application Priority Data

Apr. 27, 2023 (CN) ......................... 202320992718.8

(51) Int. Cl.
*A01K 1/02* (2006.01)
*B62B 7/04* (2006.01)
*B62B 9/12* (2006.01)

(52) U.S. Cl.
CPC .............. *A01K 1/0254* (2013.01); *B62B 7/04* (2013.01); *B62B 9/12* (2013.01)

(58) Field of Classification Search
CPC .......... A01K 1/0254; B62B 7/04; B62B 9/12; B62B 9/26
See application file for complete search history.

(56) References Cited

U.S. PATENT DOCUMENTS

| | | | | |
|---|---|---|---|---|
| 6,786,181 | B1 * | 9/2004 | Leanheart | A01K 1/0236 119/474 |
| 7,500,692 | B2 * | 3/2009 | Espenshade | B62B 9/26 280/47.38 |
| 7,588,263 | B2 * | 9/2009 | Yang | B62B 9/26 280/642 |
| 10,946,885 | B2 * | 3/2021 | Xiang | B62B 9/14 |
| 11,647,732 | B2 * | 5/2023 | Xiang | A01K 1/0254 119/496 |

(Continued)

FOREIGN PATENT DOCUMENTS

| | | | | |
|---|---|---|---|---|
| CN | 204341125 U | * 5/2015 | | A01K 29/005 |
| CN | 221986459 U | * 11/2024 | | |

(Continued)

OTHER PUBLICATIONS

KR-102436990-B1 English Translation (Year: 2022).*

(Continued)

*Primary Examiner* — Michael T. Walsh
(74) *Attorney, Agent, or Firm* — MUNCY, GEISSLER, OLDS & LOWE, P.C.

(57) ABSTRACT

The child stroller includes a frame, a front wheel assembly provided forward of a bottom of the frame, a rear wheel assembly provided rearward of a bottom of the frame, and a basket provided on the frame, wherein the child stroller further includes a pet basket detachably connected with the basket, the pet basket having an accommodation chamber for accommodating a pet, the pet basket further having an opening therein for access by the pet. The child stroller of the present invention enables travelling of a child and a pet at the same time, and the pet basket can also be disassembled, and then the stroller is only used for travel with a child.

10 Claims, 7 Drawing Sheets

(56) References Cited

U.S. PATENT DOCUMENTS

2015/0183450 A1 * 7/2015 Chen .......................... B62B 7/14
280/47.35

FOREIGN PATENT DOCUMENTS

DE 202020102798 U1 * 5/2020 ........... B62B 5/0461
KR 101894463 B1 * 9/2018 ............. B62B 7/008
KR 102436990 B1 * 8/2022 ............. A01K 1/029

OTHER PUBLICATIONS

CN-204341125-U English Translation (Year: 2015).*
DE-202020102798-U1 English Translation (Year: 2020).*
KR-101894463-B1 English Translation (Year: 2018).*
CN-221986459-U English Translation (Year: 2024).*

* cited by examiner

CHILD STROLLER AND PET BASKET THEREOF

CROSS-REFERENCE TO RELATED APPLICATIONS

This application claims priority to Chinese Application No. 2023209927188 filed on Apr. 27, 2023 with China Patent Office, the entire contents both of which are hereby incorporated by reference.

BACKGROUND ART

A child stroller is a common travelling equipment for a child to travel, which includes a frame, a front wheel assembly and a rear wheel assembly, and a basket is usually provided on the frame for the convenience of placement of objects. At present, there are more and more households feeding pets. With the improvement of feeding regulations, pet travel is limited by many conditions. For a family with a child, travelling with both a child and a pet is very inconvenient. Existing child strollers are rarely allowed to carry pets together to go out.

SUMMARY OF THE INVENTION

The technical problem to be solved by the present utility model is to overcome the deficiencies of the prior art and provide a child stroller with the capability to carry both a child and a pet.

The technical solution adopted by the present utility model to solve the technical problem thereof is described in the following content:

a child stroller including a frame, a front wheel assembly provided forward of a bottom of the frame, a rear wheel assembly provided rearward of a bottom of the frame, and a basket provided on the frame, wherein the child stroller further includes a pet basket detachably connected with the basket, the pet basket having an accommodation chamber for accommodating a pet, the pet basket further having an opening therein for access by the pet.

According to some implementation aspects of the present utility model, the basket includes a basket holder provided on the frame, the pet basket includes a pet basket holder, the basket holder is detachably connected with the pet basket holder.

In some implementations, the pet basket holder is also able to be rotationally connected with the basket holder when the basket holder is connected with the pet basket holder.

In some detailed implementations, the frame includes at least a front bracket provided with the front wheel assembly at the bottom and a rear bracket provided with the rear wheel assembly at the bottom, the basket holder is provided on the front bracket and the rear bracket, and when the pet basket is connected with the basket, the pet basket holder is able to rotate to be close to the front bracket.

In some preferred and detailed implementations, the frame is a foldable frame, the basket holder is pivotally connected with the front bracket and the rear bracket respectively, when the pet basket is connected with the basket and the child stroller is folded, the pet basket holder is pressed down to be close to the front bracket, and the frame is folded such that the pet basket holder is close to the frame.

In some detailed implementations, the pet basket holder includes a rod and a mounting seat rotatably provided at a rear end portion of the rod, and the mounting seat is detachably connected with the basket holder.

In some implementations, the basket further includes a first cloth sleeve provided on the basket holder, the pet basket further includes a second cloth sleeve provided on the pet basket holder, the second cloth sleeve forms the accommodation chamber inside, the opening is opened on the second cloth sleeve, and the first cloth sleeve and the second cloth sleeve are detachably connected with each other.

In some implementations, when the pet basket is connected to the basket, the second cloth sleeve is at least partially located in the first cloth sleeve and a portion, located in the first cloth sleeve, of the second cloth sleeve is in contact with the first cloth sleeve, and a side surface of the second cloth sleeve and/or a bottom surface of the second cloth sleeve are connected to a corresponding position of the first cloth sleeve.

Further, a side surface of the second cloth sleeve and a bottom surface of the second cloth sleeve are connected to a corresponding position of the first cloth sleeve by means of a connection assembly, and the connection assembly is a zipper, a button and buttonhole fitting, a snap fastener, a magic tape or a strap.

In some implementations, the frame includes at least a front bracket provided with the front wheel assembly at the bottom and a rear bracket provided with the rear wheel assembly at the bottom, the basket holder is provided on the front bracket and the rear bracket, an upper side edge of the first cloth sleeve is connected with the basket holder, a front side edge of the first cloth sleeve is connected with the front bracket, the second cloth sleeve is at least partially exposed out of the first cloth sleeve, and a portion, exposed out of the first cloth sleeve, of the second cloth sleeve is located in front of the front bracket.

In some implementations, the opening is provided on at least one component of a top surface of the pet basket and a side surface facing a rear of the basket when the pet basket is connected with the basket.

In some detailed implementations, the opening is respectively provided on a top surface of the pet basket and a side surface facing a rear of the basket when the pet basket is connected with the basket.

In some implementations, the opening is provided with an opening and closing device which is able to open and close the opening.

In some detailed implementations, the opening and closing device is a zipper, a button and buttonhole fitting, a snap fastener, a magic tape or a strap.

The second technical solution adopted by the present utility model is a pet basket, wherein the pet basket is configured for grafting to a child stroller, and the child stroller includes a frame, a front wheel assembly provided forward of a bottom of the frame, a rear wheel assembly provided rearward of a bottom of the frame, and a basket provided on the frame, the pet basket is detachably connected with the basket, the pet basket has an accommodation chamber for accommodating a pet, and the pet basket further has an opening therein for access by the pet.

Due to the technical solution adopted by the present utility model, the present utility model has the following advantages compared with the prior art.

The child stroller of the present utility model enable a travel with a child and a pet at the same time, and the pet basket can also be disassembled, and then it is only used for travel with a child, which diversifies use functions of the child stroller, avoids the use of the pet cage and pet cart, and thus greatly reduces travel equipment.

Figure 1:
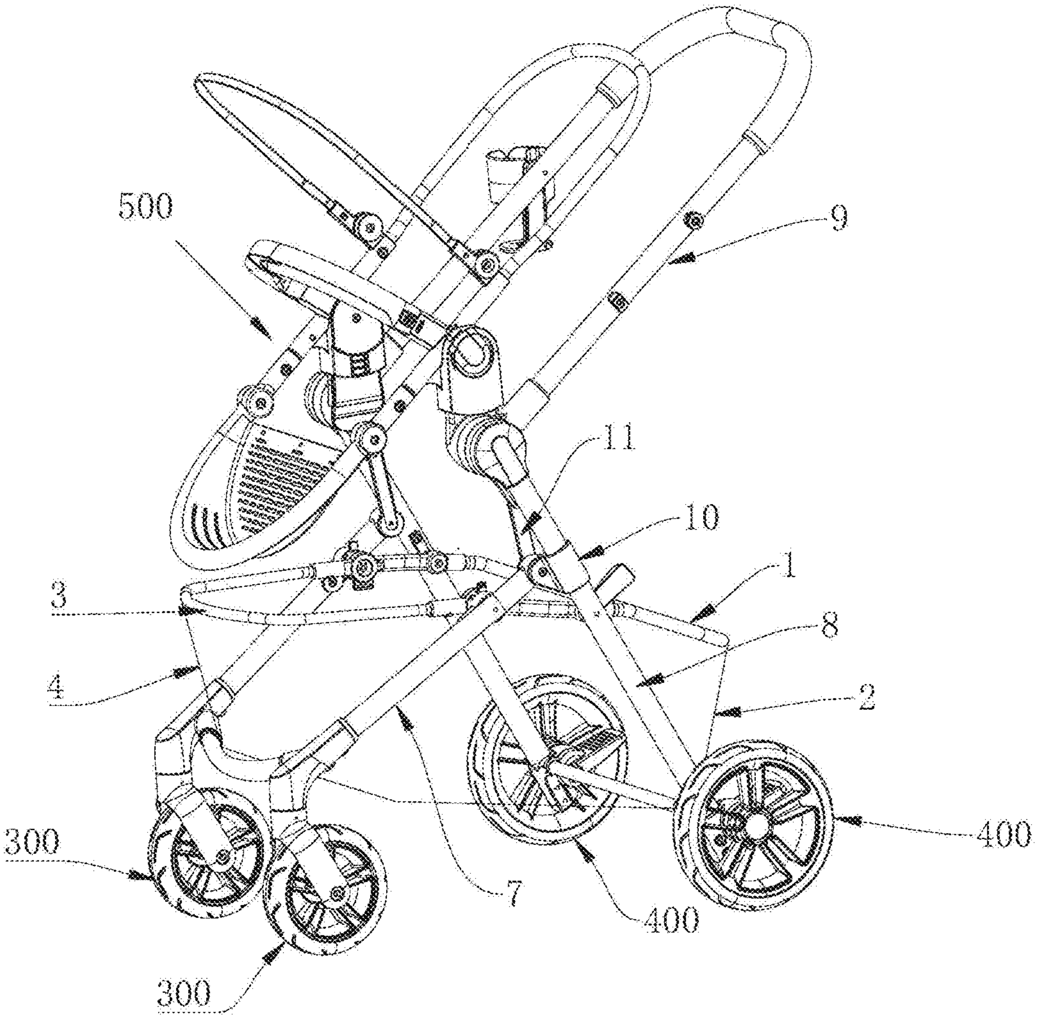
FIG. 1 is a schematic structural diagram of a child stroller of a representative embodiment of the present utility model (where the pet basket is connected with the basket)

In the drawings: 100, pet basket; 200, basket; 300, front wheel assembly; 400, rear wheel assembly; 500, sitting pocket;

- 1, basket holder; la, basket rod; 1*b*, base; 2, first cloth sleeve; 3, pet basket holder; 3*a*, rod; 3*b*, mounting seat; 4, second cloth sleeve; 5, opening; 6, zipper; 7, front bracket; 8, rear bracket; 9, push rod; 10, slider; 11, connecting rod; 12, locking member.

DETAILED DESCRIPTION OF THE INVENTION

The present utility model is further illustrated in combination with the drawings and the following specific embodiments.

Referring to FIGS. 1-7, a child stroller includes a frame, a front wheel assembly 300, a rear wheel assembly 400, a basket 200 provided on the frame, and a sitting pocket 500 detachably connected with the frame.

The structure and connection method of the sitting pocket 500 can both adopt a conventional sitting pocket structure and a conventional detachable connection method, without limitation.

The child stroller also has a pet basket 100 detachably connected with the basket 200, the pet basket 100 has an accommodation chamber for accommodating a pet, and the pet basket 100 is further provided with an opening 5 for access by the pet, so that the child stroller can simultaneously meet the needs of child travel and pet travel, and the child stroller can be used with various functions.

The frame includes side brackets, which are located on the left and right sides of the child stroller and symmetrically provided, and a transverse bracket connected between the side brackets, each side bracket includes a front bracket 7 provided with a front wheel assembly 300 at the bottom, a rear bracket 8 provided with a rear wheel assembly 400 at the bottom, and a push rod 9, the frame is foldable and has an unfolded state and a folded state, and in other embodiments, the frame can also be a frame which cannot be folded.

Figure 2:
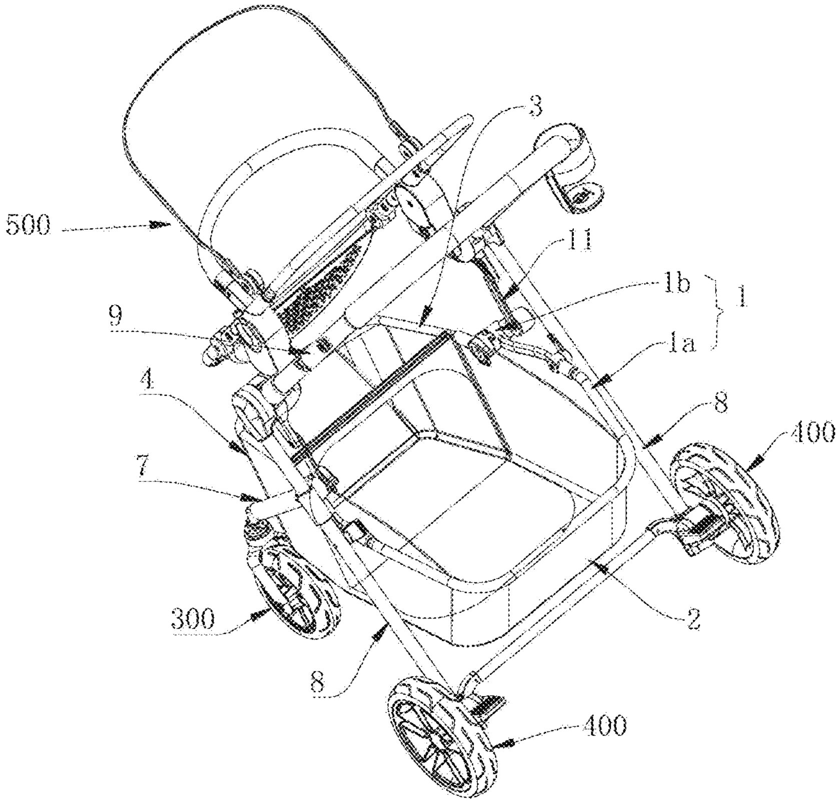
FIG. 2 is a schematic structural diagram of the child stroller in FIG. 1 from another perspective.
Figure 3:
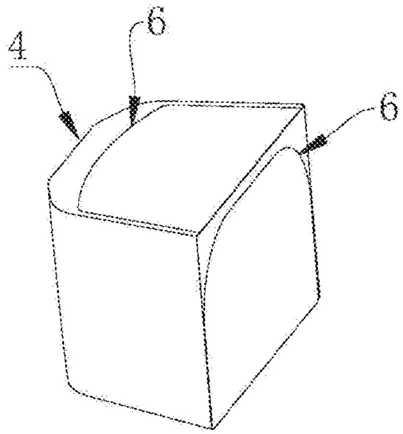
FIG. 3 is a schematic structural diagram of a second cloth sleeve of the pet basket in FIG. 1.
Figure 4:
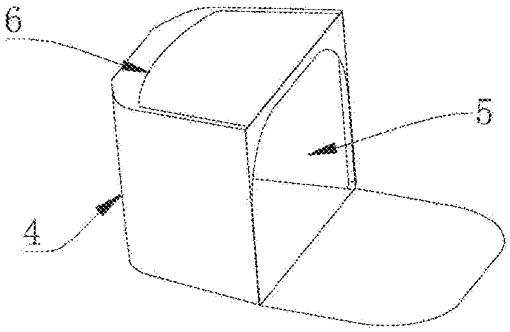
FIGS. 4 and 5 are schematic structural diagrams of the second cloth sleeve, in which different openings are opened, of the pet basket in FIG. 3.
Figure 5:
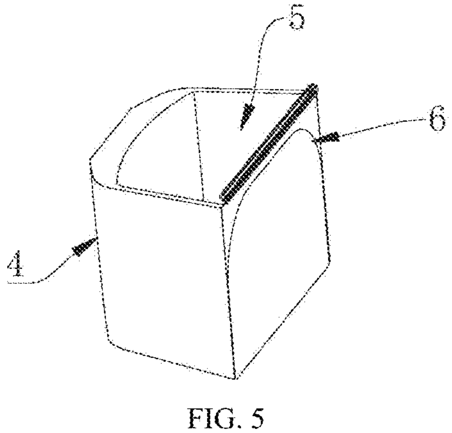

Referring to FIGS. 1 and 2, in the present embodiment, each side bracket further includes a slider 10 and a connecting rod 11 slidingly connected to the rear bracket 8 along a length direction of the rear bracket 8, wherein in the unfolded state of the frame, an upper end portion of the connecting rod 11, a lower end portion of the push rod 9 and an upper end portion of the rear bracket 8 are pivotally connected among one another, and a lower end portion of the connecting rod 11, the slider 10 and an upper end portion of the front bracket 7 are pivotally connected among one another. In the unfolded state of the child stroller, the basket 200 includes a basket holder 1 extending in a front-rear direction of the child stroller and pivotally connected with the front brackets 7 on both sides and the rear brackets 8 on both sides, respectively, and a first cloth sleeve 2 provided on the basket holder 1, and the basket holder 1 includes a basket rod 1*a* pivotally connected with the front brackets 7 on both sides and the rear brackets 8 on both sides, respectively.

In this example, the basket rod 1*a* is a first U-shaped bar extending in the front-rear direction of the child stroller and opening to the front, a base 1*b* is fixedly connected with a front end portion of the first U-shaped bar, the base 1*b* on each side is pivotally connected with the front bracket 7 on the corresponding side, the middle portion of the first U-shaped bar is pivotally connected with the rear brackets 8 on both sides, an upper side edge of the first cloth sleeve 2 is connected with the first U-shaped bar, and a front side edge of the first cloth sleeve 2 is connected with the front brackets 7 on both sides.

The pet basket 100 includes a pet basket holder 3 detachably connected with the base 1*b* and a second cloth sleeve 4 provided on the pet basket holder 3, wherein the second cloth sleeve 4 forms an accommodation chamber inside for accommodating the pet, an opening 5 is opened on the second cloth sleeve 4, an opening and closing device capable of opening and closing the opening 5 is provided on the opening 5, and the opening and closing device can be a zipper 6.

Figure 8:
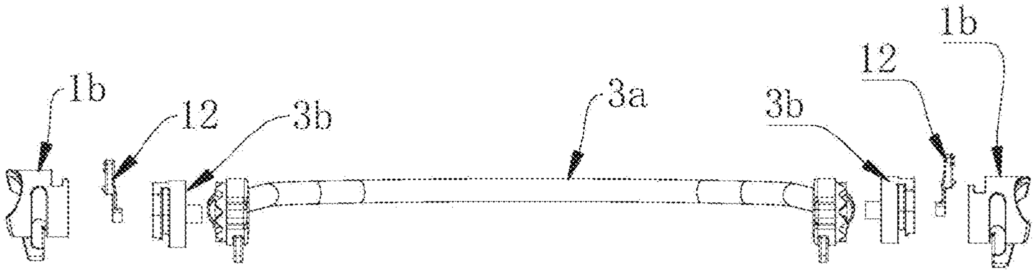
FIG. 8 is an exploded view of a pet basket holder and a base of the child stroller in FIG. 1.
Figure 9:
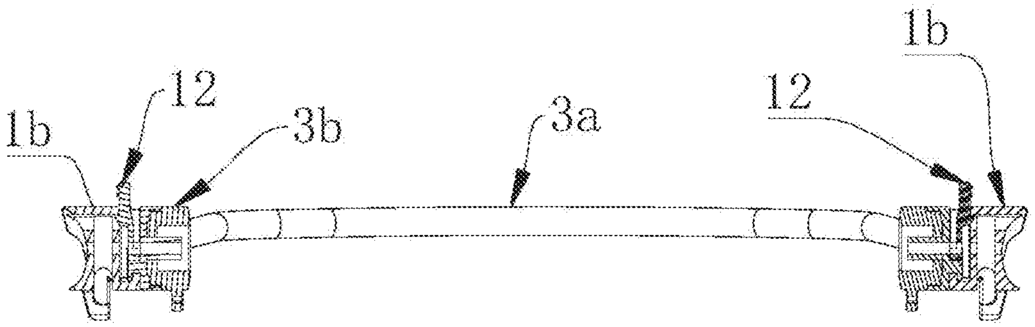
FIG. 9 is a schematic full cross-sectional view of the child stroller in FIG. 1 where the pet basket holder is connected with the base.

With reference to FIGS. 8 and 9, the pet basket holder 3 includes a rod 3*a*, the rod 3*a* is a second U-shaped bar, the second cloth sleeve 4 is provided on the second U-shaped bar, a mounting seat 3*b* is pivotally connected with an end of the second U-shaped bar, when the pet basket 100 is connected with the basket 200, the second U-shaped bar extends in the front-rear direction of the child stroller and the opening faces rearward, the mounting seat 3*b* is connected with the base 1*b*, and the mounting seat 3*b* and the base 1*b* are locked via a locking mechanism, a structure of which is not limited, and a conventional locking mechanism can be used. For example, the locking member 12 movably provided on the mounting seat 3*b* and the locking groove provided on the base 1*b* can be cooperatively locked.

Figure 7A:
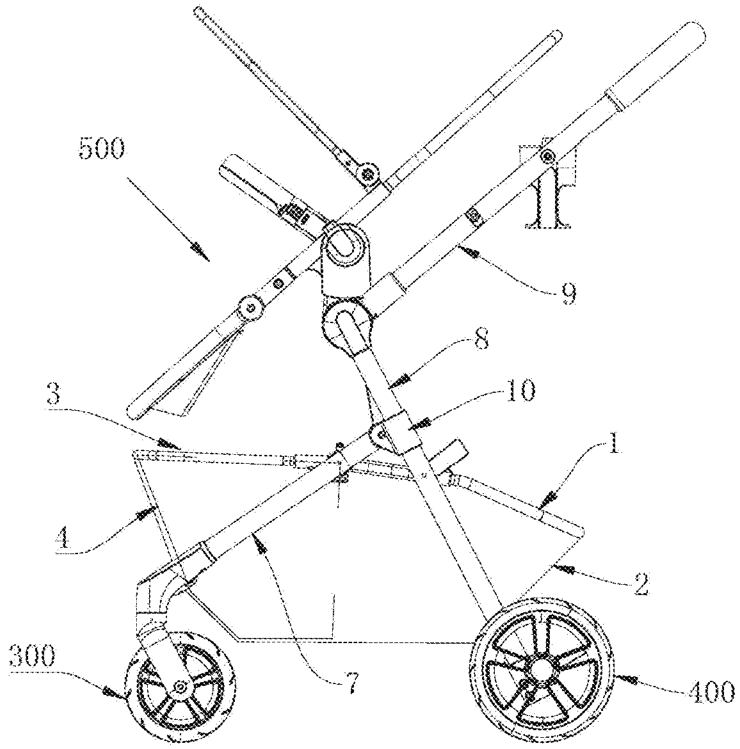
FIGS. 7(*a*)-7(*c*) are schematic diagrams of a progress that a rod of the child stroller in FIG. 1 approaches a front bracket.
Figure 7B:
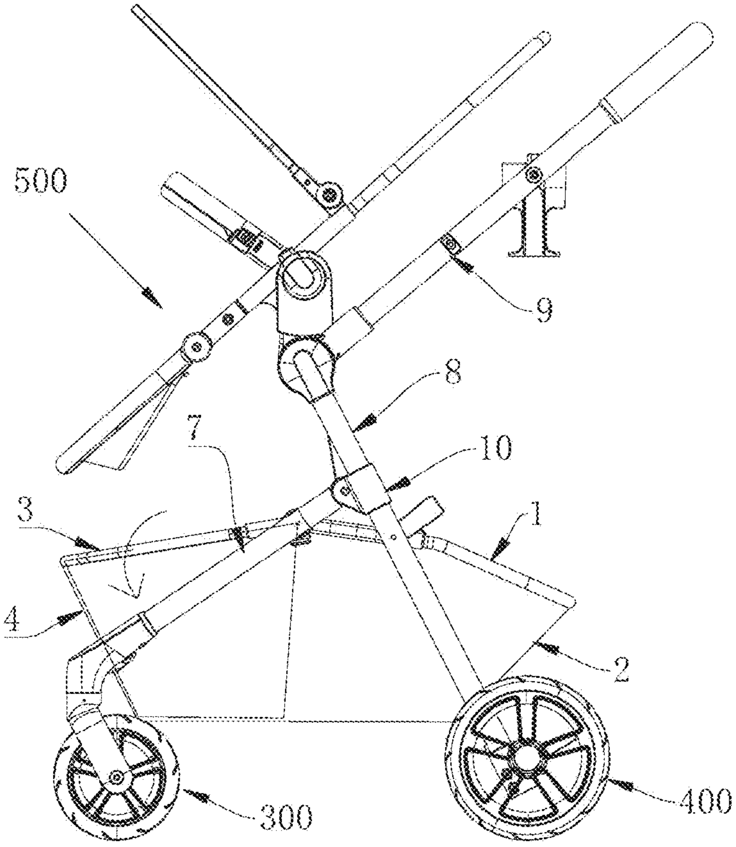
Figure 7C:
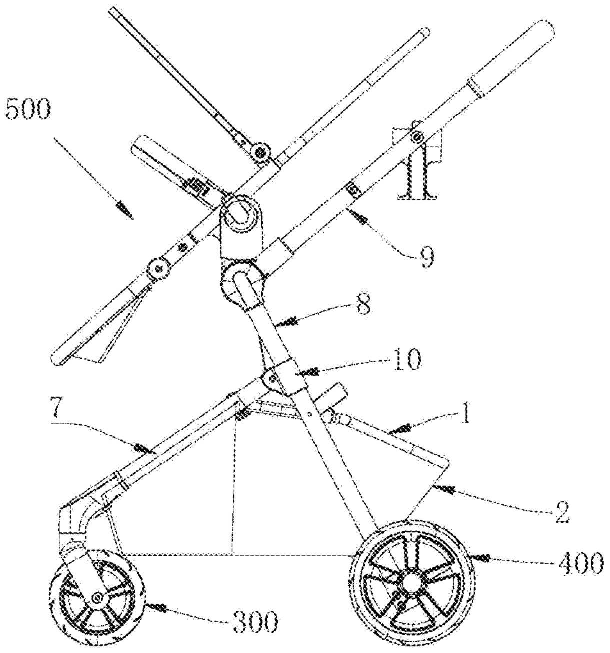

The rod 3*a* and the mounting seat 3*b* are locked via a damping locking mechanism, wherein the damping locking mechanism can lock the rod 3*a* and the mounting seat 3*b* at different angles, and the damping locking mechanism can adopt a conventional damping locking mechanism. With reference to FIGS. 7(*a*)-7(*c*), when the pet basket 100 is connected with the basket 200, the damping locking mechanism is used for locking the rod 3*a* and the front bracket 7 at different angles relative to each other, and the rod 3*a* can rotate to be close to the front bracket 7, so that when the child stroller is folded, the pet basket 100 can be folded along with the folding of the frame.

With reference to FIGS. 1-5, an opening 5 is respectively provided on a top surface of the second cloth sleeve 4 and a side surface facing a rear of the basket 200, the zipper 6 is provided on the opening 5 for opening and closing the opening 5, and the second cloth sleeve 4 is detachably connected with the first cloth sleeve 2.

Specifically, when the pet basket 100 is connected with the basket 200, a portion of the second cloth sleeve 4 is located in the first cloth sleeve 2 and the portion, located in the first cloth sleeve 2, of the second cloth sleeve 4 is in contact with the first cloth sleeve 2, so that the pet basket 100 and the basket 200 are integrated, the other portion of the second cloth sleeve 4 is exposed out of the first cloth sleeve 2, and the portion, exposed out of the first cloth sleeve 2, of the second cloth sleeve 4 is located in front of the front bracket 7. A side surface and a bottom surface of the portion, located in the first cloth sleeve 2, of the second cloth sleeve 4 are connected with corresponding positions of the first cloth sleeve 2 using a magic tape. In addition, the side surface, facing the basket 200, of the second cloth sleeve 4 (namely, a rear side surface of the second cloth sleeve 4) is provided with the opening 5, and opening the opening 5 can make full use of the space of the first cloth sleeve 2, and a whole interior of the first cloth sleeve 2 can be used as a movement space for the pet.

When the child stroller is used, the pet basket 100 can be connected with the basket 200, which enables a travel with a child and a pet at the same time, and the pet basket 100 can also be disassembled, and then it is only used for travel with a child, which diversifies use functions of the child stroller, avoids the use of the pet cage and pet cart, and thus greatly reduces travel equipment. And after the pet basket 100 is connected with the basket 200, the rod 3*a* is pressed down, so that the rod 3*a* can rotate to approach the front bracket 7, then the frame is folded, the pet basket 100 can be folded along with the frame, and the folding operation is convenient and the child stroller is easy to carry.

In the description of the present utility model, reference to "pivotally connected" means that a plurality of components are connected to each other via an axis of rotation about which the connected components can rotate.

Figure 6:
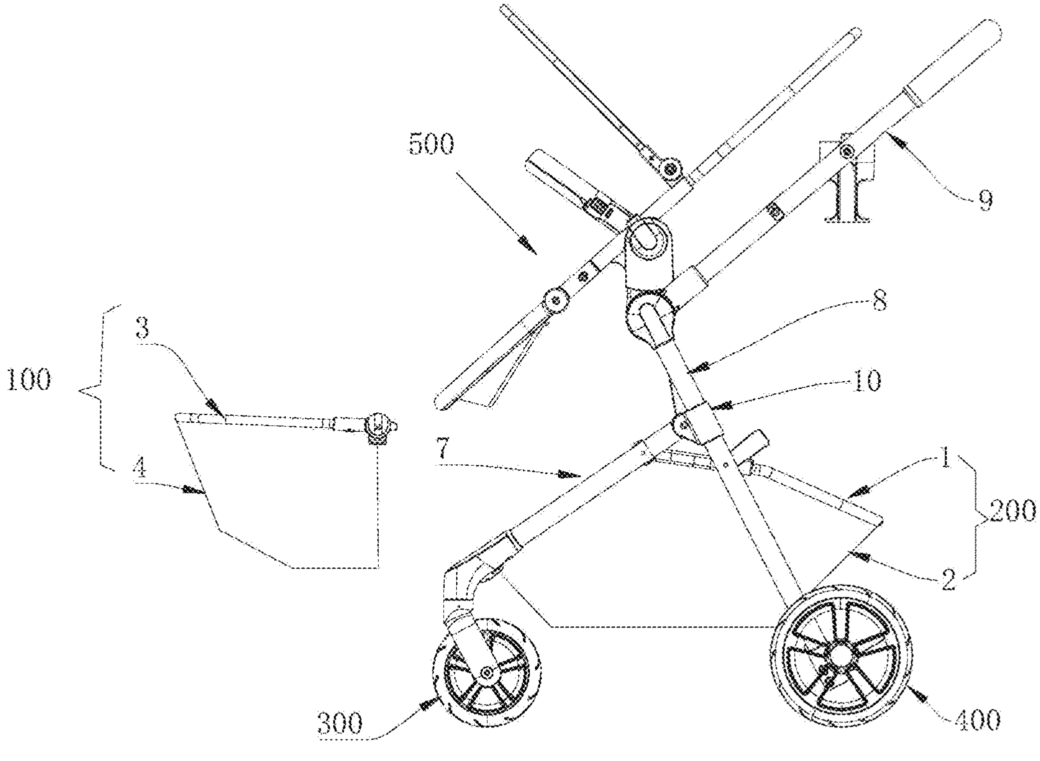
FIG. 6 is a side view of the child stroller in FIG. 1 (with the pet basket separated from the basket)

In the description of the present utility model, the directions involved, such as "front", "rear", "left", "right", "up" and "down", are all defined with reference to the directions observed by the user when pushing the child stroller. As shown in FIG. 6, the left-side direction in the drawing is "front", the right-side direction in the drawing is "rear", the upper-side direction in the drawing is "up", the lower-side direction in the drawing is "down", and the directions perpendicular to the viewing angle in the drawing are "left" and "right". The definitions of the above-mentioned directions are merely to facilitate the description of the present utility model and simplify the description and do not intended or implied that the device or element referred to must have a particular orientation or be constructed and operated in a particular orientation, and are therefore not to be construed as limiting the present utility model.

The above-mentioned embodiments are merely illustrative of the technical concept and features of the present utility model, and are intended to enable a person skilled in the art to understand the contents of the present utility model and implement the same, and thus do not limit the scope of the present utility model. Any equivalent changes or modifications made according to the spirit of the present utility model should be included in the scope of the present utility model.

The invention claimed is:

1. A child stroller, comprising a frame, a wheel assembly provided at a bottom of the frame, a basket provided on the frame, and a pet basket detachably connected with the basket, wherein, the basket comprises a first cloth sleeve forming a first accommodation chamber, the pet basket comprises a second cloth sleeve enclosing a second accommodation chamber for accommodating a pet, the pet basket further having an opening therein for access by the pet;

when the pet basket is connected with the basket, the first cloth sleeve and the second cloth sleeve are connected with each other, the first accommodation chamber and the second accommodation chamber are communicated by the opening provided on a side surface of the second cloth sleeve facing the basket, to form a movement space for the pet.

2. The child stroller according to claim 1, wherein the basket comprises a basket holder provided on the frame, the pet basket comprises a pet basket holder, and the basket holder is detachably connected with the pet basket holder.

3. The child stroller according to claim 2, wherein the frame at least comprises a front bracket and a rear bracket, the wheel assembly comprises a front wheel assembly and a rear wheel assembly provided at a bottom of the front bracket and the rear bracket respectively, the pet basket is disposed on the front bracket and the rear bracket, when the basket is engaged with the pet basket, the pet basket holder is rotationally connected with the basket holder to enable rotation of the pet basket holder between a first position and a second position, when the pet basket holder rotates to the first position, the pet basket is unfolded, when the pet basket holder rotates to the second position, the pet basket holder is close to the front bracket.

4. The child stroller according to claim 3, wherein the frame is a foldable frame, the basket holder is pivotally connected with the front bracket and the rear bracket respectively, when the pet basket is connected with the basket and the child stroller is folded, the basket holder is close to the front bracket and the back bracket, when the pet basket holder is pressed down, the pet basket holder gets close to the front bracket, therefore the pet basket holder gets close to the frame.

5. The child stroller according to claim 3, wherein the first cloth sleeve is provided on the basket holder, the second cloth sleeve is provided on the pet basket holder and the first cloth sleeve and the second cloth sleeve are detachably connected with each other.

6. The child stroller according to claim 5, wherein when the pet basket is connected with the basket, the second cloth sleeve is at least partially located in the first cloth sleeve which is in contact with the first cloth sleeve, and a side surface of the second cloth sleeve and/or a bottom surface of the second cloth sleeve are connected to a corresponding position of the first cloth sleeve.

7. The child stroller according to claim 5, wherein a top side of the first cloth sleeve is connected with the basket holder, the front side of the first cloth sleeve is connected with the front bracket, the second cloth sleeve has a portion that is exposed outside of the first cloth sleeve and the portion is located at the front side of the front bracket.

8. The child stroller according to claim 5, wherein the child stroller further comprises a sitting pocket connected to the frame, and the sitting pocket is located above the basket.

9. The child stroller according to claim 2, wherein the pet basket holder comprises a rod and a mounting seat rotatably provided at a rear end portion of the rod, and the mounting seat is detachably connected with the basket holder.

10. The child stroller according to claim 1, wherein the opening is provided with an opening and closing device which is able to open and close the opening.

* * * * *